Jan. 30, 1968  L. R. BERGSTRÖM  3,366,841
ARRANGEMENT FOR FACILITATING CURRENT INTERRUPTIONS
DURING SHORT LINE FAULTS
Filed Oct. 12, 1965
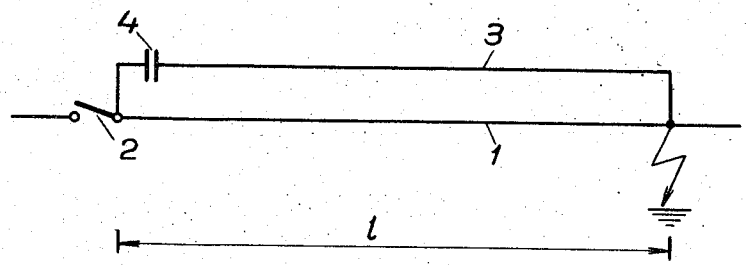
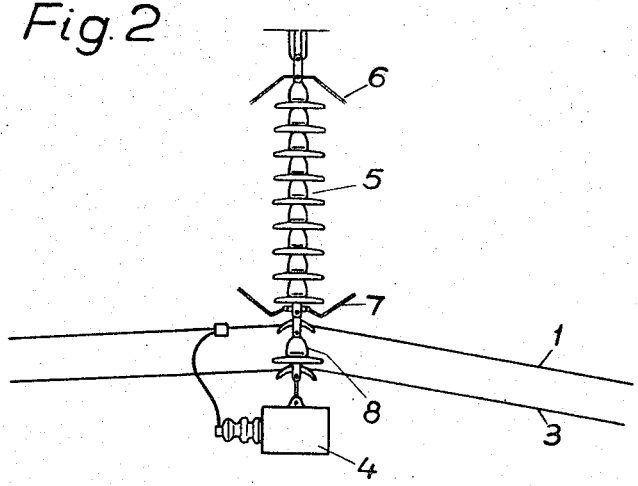
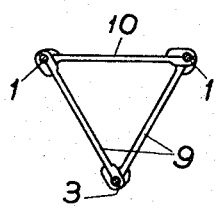
INVENTOR.
Lars Ragnar Bergström
BY
Bailey, Stephens + Huettig
Attorneys

United States Patent Office 3,366,841
Patented Jan. 30, 1968

3,366,841
ARRANGEMENT FOR FACILITATING CURRENT INTERRUPTIONS DURING SHORT LINE FAULTS
Lars Ragnar Bergström, Ludvika, Sweden, assignor to Allmänna Svenska Elektriska Aktiebolaget, Vasteras, Sweden, a Swedish corporation
Filed Oct. 12, 1965, Ser. No. 495,165
Claims priority, application Sweden, Dec. 8, 1964, 14,800/64
3 Claims. (Cl. 317—11)

ABSTRACT OF THE DISCLOSURE

A high voltage multiphase overhead line has a circuit breaker connected in series with the line and an extra conductor beside each phase conductor, connected at one end to the phase conductor at a point between 0.2 and 20 km. from the breaker while the other end is connected to the phase conductor close to the circuit breaker through a capacitor.

---

The present invention relates to an arrangement in networks for electrical energy transmission and the object of the invention is to reduce the stress on a circuit breaker in the network during so-called short-line faults.

Short line fault is the usual name of a short circuit which occurs on a line at a certain distance, for example a few kilometres from a breaker. Such faults can cause the appearance of extremely high rates of rise of the recovery voltage across the breaker terminals. This transient recovery voltage is the algebraic sum of two voltages, the one corresponding to the voltage oscillation on the line between the breaker and the fault, and the other to the transient voltages upon the connection of the breaker to the feeding side of the network. The first mentioned voltage is of saw-tooth form and has a very high frequency, while the latter voltage oscillates at the comparatively low natural frequency of the feeding network. The initial rate of rise of the recovery voltage will thus be substantially determined by the voltage on the line side where the fault occurs.

Even though short line faults have been apparent since the beginning of the transmission of electrical power, the severity of this type of stress on circuit breakers has not been observed until recently. The reason for this is that the rate of rise of the recovery voltage occurring across the breaker terminals during short line faults is proportional to the sort circuit current. Thus, since the short circuit current in some larger networks has reached a value exceeding 30,000 amps, the short line faults have given rise to such a stress on the breakers intended to interrupt the short circuit current, particularly air blast circuit breakers, that special precautions must be taken in order to make it possible to interrupt when such faults occur.

By providing the breaker with a parallel resistor, the rate of rise as well as the peak value of the voltage oscillation caused by the faulty line can be reduced. In order to achieve the desired effect, however, this resistor must have a resistance value which does not rise to any extent above the surge impedance of the line, that is, approximately 450 ohms for overhead lines. It is very difficult to design such relatively low ohmic high voltage resistors with limited dimensions, and comprehensive precautions must usually be taken for the insulation and cooling of the resistor. Such breakers will, therefore, be comparatively expensive.

According to the present invention, the above mentioned problem is solved by arranging an extra conductor beside each phase conductor on at least one side of the circuit breaker. One end of the extra conductor is connected to the respective phase conductor at an optimum point lying between 0.2 and 20 kilometres from the circuit breaker, while its other end lying in the vicinity of the circuit breaker, is connected to said phase conductor through a capacitor. On the line section between the end points of the conductor the extra conductor is electrically insulated from the phase conductor.

Within the given limits the length of the extra conductor is dependent on the configuration of the line, as well as the characteristics of the breaker. It is therefore suitable to determine the exact length experimentally.

The extra conductor, capacitor and phase conductor form together an oscillating circuit whose inductance is determined by the line loop formed by the conductors, while the capacitance is chosen so that the oscillation on the line side upon a short line fault is of comparatively low frequency. Thereby in a simple way the rate of rise of the recovery voltage is reduced to a safe value for the breaker.

If the phase conductor is made of a multiple conductor, for example a triple or quadruple conductor, the extra conductor can be one partial conductor of this multiple conductor. This partial conductor should be insulated from the remaining partial conductors on the line section in question by means of insulating spacing elements.

Because of the comparatively low voltage between the extra conductor and the phase conductor, the dimensions of the capacitor are relatively small and it can therefore suitably be suspended in the line.

The invention will be described in more detail in connection with the embodiment shown in the accompanying drawing. FIGURE 1 of the drawing shows diagrammatically a part of a single-phase high voltage line according to the invention. FIGURE 2 shows how the extra conductor can be connected to the phase conductor in the vicinity of the circuit breaker. FIGURE 3 shows a cross section through a triple conductor provided with insulating spacing elements.

In FIGURE 1, a phase conductor 1 is shown, which belongs to a three-phase overhead line for high voltage intended for the transmission of electrical energy in the direction from left to right. A circuit breaker 2 with high breaking capacity is connected in series with the conductor 1. Beside the phase conductor 1 an extra conductor 3 is arranged. One end of this extra conductor is connected to the phase conductor 1 at a distance 1 from the breaker 2. This distance 1 can for example be 5 kilometers. The other end of the extra conductor is connected to the phase conductor 1 over a capacitor 4 at a point in the vicinity of the breaker 2. The capacitor 4 has a relatively high reactance at the service frequency of the alternating current network, so that during normal operation practically no current flows through the extra conductor 3. On the occasion of a short circuit in the vicinity of the distance 1 from the breaker, a voltage drop arises in the line section between the breaker and the fault. This voltage drop is proportional to the short circuit current and to the reactance of the line. When the current is broken at current zero this voltage is at its maximum. After the breaking this voltage is damped and the frequency of this damped voltage is determined by the inductance of the loop formed by the conductors 1 and 3 and the capacitance of the capacitor 4. Through the introduction of the capacitor and the extra conductor, a relatively low value capacitance is sufficient to reduce the frequency of the voltage oscillation of the faulty line from, for example, 50 kilocycles to 1 kilocycle. The dielectric strength of the breaking gap therefore has time to rise faster than the recovery voltage, so that no re-ignition is possible.

In FIGURE 2 is shown a suspension insulator assembly 5 for a 130 kilovolts line provided with upper and lower arcing horns 6 and 7 respectively. The suspension insulator assembly is arranged in the vicinity of the circuit breaker and the figure shows as an example how the extra conductor 3 can be connected to the phase conductor 1 through the capacitor 4. The extra conductor is insulated from the phase conductor by means of a suspension insulator element 8, which can be designed for a voltage of, for example, 20 kilovolts. To the left of the capacitor 4 the conductors 1 and 3 extend to a strain insulator not shown, at which the extra conductor 3 is insulated from the phase conductor 1. The capacitor 4 can also be suspended in this strain insulator, instead of being arranged as shown.

At higher operating voltages, the phase conductors are often so-called multiple conductors, whose partial conductors are usually connected to each other by means of conducting spacer elements mounted on the line at intervals of, for example, 40–50 meters. With such lines one of the part conductors of a line section in the vicinity of the circuit breaker can constitute the above mentioned extra conductor. On FIGURE 3 is shown a cross section of a triple conductor whose one part conductor 3 is insulated from the two remaining part conductors 1 by means of insulating spacer elements 9. The partial conductors 1 are in their turn electrically connected to each other by means of the conducting spacer element 10. The partial conductor 3 here corresponds to the extra conductor shown in FIGURES 1 and 2.

I claim:

1. An arrangement for transmitting electrical energy at high voltage, said arrangement comprising a multi-phase alternating current overhead line and a circuit breaker connected in series with said line, a capacitor, an extra conductor arranged beside each phase conductor on at least one side of said circuit breaker, the one end of said extra conductor being electrically connected to the respective phase conductor at an optimum point from said circuit breaker, the other end in the vicinity of the circuit breaker being connected to said phase conductor through said capacitor, said extra conductor on the line section being electrically insulated from said phase conductor between said ends.

2. In an arrangement according to claim 1, said phase conductor being a multiple conductor and said extra conductor being a partial conductor in said multiple conductor, said partial conductor on said line section being insulated from the remaining partial conductors by means of insulating spacer elements.

3. The device according to claim 1, wherein said capacitor is suspended in said line.

References Cited

UNITED STATES PATENTS

| | | | |
|---|---|---|---|
| 1,350,300 | 8/1920 | Crumpton | 317—11 X |
| 1,416,482 | 5/1922 | Longoria | 317—11 X |
| 1,419,872 | 6/1922 | McLain | 317—11 X |
| 3,283,211 | 11/1966 | Claesson | 317—11 |

LEE T. HIX, *Primary Examiner.*

R. V. LUPO, *Assistant Examiner.*